(12) United States Patent
Gyllenhammar et al.

(10) Patent No.: US 11,983,918 B2
(45) Date of Patent: May 14, 2024

(54) PLATFORM FOR PERCEPTION SYSTEM DEVELOPMENT FOR AUTOMATED DRIVING SYSTEM

(71) Applicant: ZENSEACT AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: ZENSEACT AB, Gothenburg (SE)

( * ) Notice: Subject to any disclaimer, the term of this patent is extended or adjusted under 35 U.S.C. 154(b) by 267 days.

(21) Appl. No.: 17/672,798

(22) Filed: Feb. 16, 2022

(65) Prior Publication Data

US 2022/0270356 A1 Aug. 25, 2022

(30) Foreign Application Priority Data

Feb. 19, 2021 (EP) .................................... 21158016

(51) Int. Cl.
*G06V 10/778* (2022.01)
*G06V 10/774* (2022.01)
*G06V 20/56* (2022.01)

(52) U.S. Cl.
CPC ...... *G06V 10/7747* (2022.01); *G06V 10/7792* (2022.01); *G06V 20/56* (2022.01)

(58) Field of Classification Search
CPC ........... G06V 10/7747; G06V 10/7792; G06V 10/98; G06V 20/56; G06V 20/58; G06V 20/588; G06F 18/2155; G06F 18/217; G06F 8/20; G06F 8/73; G06N 3/04; G06N 3/084; G06N 3/09; G06Q 50/30
See application file for complete search history.

(56) References Cited

U.S. PATENT DOCUMENTS

| 2017/0160744 | A1* | 6/2017 | Chia ...................... B60W 30/12 |
| 2018/0025234 | A1* | 1/2018 | Myers .................. G05D 1/0088 |
| | | | 348/148 |
| 2018/0314921 | A1* | 11/2018 | Mercep .................. G06T 7/521 |
| 2020/0210778 | A1 | 7/2020 | Orlov |

FOREIGN PATENT DOCUMENTS

| WO | 2019/232335 A1 | 12/2019 |
| WO | 2020/056331 A1 | 3/2020 |
| WO | 2020/079698 A1 | 4/2020 |

OTHER PUBLICATIONS

Extended European Search Report dated Aug. 26, 2021 for European Application No. 21158016.2, 8 pages.

* cited by examiner

*Primary Examiner* — Aaron W Carter
*Assistant Examiner* — Kathleen M Broughton
(74) *Attorney, Agent, or Firm* — Sage Patent Group

(57) ABSTRACT

The present invention relates to methods and systems that utilize the production vehicles to develop new perception features related to new sensor hardware as well as new algorithms for existing sensors by using federated learning. To achieve this, the production vehicle's own worldview is post-processed and used as a reference, towards which the output of the software (SW) or hardware (HW) under development is compared. In case of a large discrepancy between the baseline worldview and perceived worldview by the module-under-test, the data is weakly annotated by the baseline worldview. Such weakly annotated data may subsequently be used to update the SW parameters of the "perception model" in the module-under-test in each individual vehicle, or to be transmitted to the "back-office" for off-board processing or more accurate annotations.

14 Claims, 6 Drawing Sheets

PLATFORM FOR PERCEPTION SYSTEM DEVELOPMENT FOR AUTOMATED DRIVING SYSTEM

CROSS-REFERENCE TO RELATED APPLICATIONS

The present application for patent claims priority to European Patent Office Application Ser. No. 21158016.2, entitled "PLATFORM FOR PERCEPTION SYSTEM DEVELOPMENT FOR AUTOMATED DRIVING SYSTEMS" filed on Feb. 19, 2021, assigned to the assignee hereof, and expressly incorporated herein by reference.

TECHNICAL FIELD

The present disclosure relates to methods and systems for weakly annotating data for training of a perception-development module of a vehicle equipped with an Automated Driving System (ADS).

BACKGROUND

During the last few years, the research and development activities related to autonomous vehicles have exploded in number, and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Much of the current efforts for development of ADSs revolves around safely launching a first system to the market. However, once that is achieved it will be paramount to improve the system in a safe and efficient manner, both to achieve cost reductions as well as performance improvements. Generally, there are significant costs associated with the development and verification of perception algorithms of the ADS. The perception algorithms, such as for example "vision" algorithms, are dependent on massive sets of hand-labelled (annotated) data for training of the machine learning models. Creating such hand-labelled datasets is not only very expensive but also extremely time consuming, especially when domain expertise is required.

There is accordingly a need in the art for new solutions for facilitating development and verification of ADSs in order to continuously be able to provide safer and more performant systems. In particular, there is a need for new and efficient solutions for identifying high-quality data suitable for use as training data for machine learning algorithms employed in perception algorithms of the ADS. Moreover, such high-quality data may advantageously be utilized for verification and validation of ADS features and for facilitating development of new ADS features. As always, the improvements shall preferably be made without significant impact on the size, power consumption and cost of the on-board system or platform.

SUMMARY

It is therefore an object of the present invention to provide a method performed by a computing system for weakly annotating data for training of a perception-development module of a vehicle, a computer-readable storage medium, a system, and a vehicle comprising such as system that alleviate all or at least some of the above-discussed drawbacks of presently known systems and methods.

This object is achieved by means of a provide a method performed by a computing system for weakly annotating data for training of a perception-development module of a vehicle, a computer-readable storage medium, a system, and a vehicle as defined in the appended claims. The term exemplary is in the present context to be understood as serving as an instance, example or illustration.

According to a first aspect of the present invention, there is provided a method performed by a computing system for weakly annotating data for training of a perception-development module of a vehicle, where the vehicle is equipped with an ADS. The method comprises storing, during a time period, sensor data obtained from a set of vehicle-mounted sensors configured to monitor a surrounding environment of the vehicle. The method further comprises storing, during the time period, a first set of perception data obtained from a perception module of the vehicle. The perception module is configured to generate the first set of perception data based on sensor data obtained from one or more of the set of vehicle-mounted sensors during the time period. Further, the method comprises forming, by post-processing the first set of perception data, a baseline worldview from the obtained first set of perception data. The baseline worldview is indicative of the surrounding environment of the vehicle during the time period. The method further comprises storing, during the time period, a second set of perception data from the perception-development module. The perception-development module is configured to generate the second set of perception data based on a perception model and sensor data obtained from one or more of the set of vehicle-mounted sensors during the time period. The second set of perception data is indicative of a perceptive parameter of the surrounding environment of the vehicle during the time period. Furthermore, the method comprises evaluating the second set of perception data against the formed baseline worldview in order to identify a match between the perceptive parameter of the second set of perception data and a corresponding perceptive parameter in the baseline worldview. Then, if a match between the perceptive parameter of the second set of perception data and the corresponding perceptive parameter in the baseline worldview is identified, the method further comprises determining an estimation error of the matched perceptive parameter of the second set of perception data in reference to the corresponding perceptive parameter in the baseline worldview. Moreover, if no match between the perceptive parameter of the second set of perception data and the corresponding perceptive parameter in the baseline worldview is identified or if the estimation error exceeds a threshold, the method further comprises updating one or more parameters of the perception model of the perception-development module by means of a weakly supervised learning algorithm based on the sensor data used for the second set of perception data and by using the baseline worldview as weakly annotated data in order to form a supervision signal, or transmitting the stored sensor data, the stored second set of perception data, and the baseline worldview as weakly annotated data to a remote entity for off-board processing.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

In accordance with a third aspect of the present invention there is provided a system for weakly annotating data for training of a perception-development module of a vehicle, where the vehicle is equipped with an ADS. The system comprises control circuitry configured to store, during a time period, sensor data obtained from one or more vehicle-mounted sensors configured to monitor a surrounding environment of the vehicle. The control circuitry is further configured to store, during the time period, a first set of perception data obtained from the perception module (of the "production platform") of the vehicle. The perception module is configured to generate the first set of perception data based on sensor data obtained from one or more vehicle-mounted sensors during the time period. Furthermore, the control circuitry is configured to form, by post-processing the first set of perception data, a baseline worldview indicative of a scenario in the surrounding environment of the vehicle during the time period. The control circuitry is further configured to obtain a second set of perception data from the perception-development module, where the perception-development module is configured to generate the second set of perception data based on a perception model and sensor data obtained from one or more vehicle-mounted sensors during the time period. The second set of perception data is indicative of a perceptive parameter of the surrounding environment of the vehicle during the time period. Furthermore, the control circuitry is configured to evaluate the obtained second set of perception data against the formed baseline worldview in order to identify a match between the perceptive parameter of the second set of perception data and a corresponding perceptive parameter in the baseline worldview. Then, if a match between the perceptive parameter of the second set of perception data and the corresponding perceptive parameter in the baseline worldview is identified, the control circuitry is further configured to determine an estimation error of the matched perceptive parameter of the second set of perception data in reference to the corresponding perceptive parameter in the baseline worldview. Still further, if no match between the perceptive parameter of the second set of perception data and the corresponding perceptive parameter in the baseline worldview is identified or if the estimation error exceeds a threshold, the control circuitry is further configured to perform at least one of the following:

Update one or more parameters of the perception model of the perception-development module by means of a weakly supervised learning algorithm based on the sensor data used for the second set of perception data and by using the baseline worldview as weakly annotated data in order to form a supervision signal.

Transmit the stored sensor data, the stored second set of perception data, and the baseline worldview as weakly annotated data to a remote entity for off-board processing.

With this aspect of the invention, similar advantages and preferred features are present as in the previously discussed first aspect of the invention.

According to a fourth aspect of the present invention, there is provided a vehicle comprising a set of vehicle-mounted sensors configured to monitor a surrounding environment of the vehicle. The vehicle further comprises an automated driving system (ADS) having a perception module configured to generate a first set of perception data based on sensor data obtained from one or more of the set of vehicle-mounted sensors. The vehicle further has a perception development module configured to generate the second set of perception data based on a perception model and sensor data obtained from one or more of the set of vehicle-mounted sensors, and a system for weakly annotating data for training of the perception-development module according to according to any one of the embodiments disclosed herein. With this aspect of the invention, similar advantages and preferred features are present as in the previously discussed first aspect of the invention. With this aspect of the invention, similar advantages and preferred features are present as in the previously discussed first aspect of the invention.

The herein proposed methods, computer-readable storage media, systems, and vehicles accordingly provide a learning platform that utilizes the production system and sensors of the ADS in order to carry out a federated learning process for new software and hardware versions of various perception features in autonomous driving applications. In more detail, the herein proposed learning regime relies on a post-processing of the "worldview" (i.e. perception output) of the production ADS, whose performance has been validated and verified, so to construct a "baseline" towards which the output of the software/hardware under development is compared in order to generated weakly annotated training data. Thereby readily providing advantages in terms of:

- Realization of a cost-effective data annotation engine for enabling efficient development of new perception features.
- An automated solution for finding data suitable for annotation (part of data that if annotated it can improve the performance of software under development). This decreases the annotation cost for development of a new perception software for autonomous driving applications.
- Enables the use of weakly supervised algorithm to update perception software under development locally in the vehicle which substantially reduces the annotation cost by lowering the need for manual data annotation.
- Efficient utilization of available production resources in the production vehicles to facilitate the development of new perception features in autonomous driving applications.
- An automated solution for gathering high-quality data for development of new perception features in autonomous driving applications that may subsequently be used for manual analysis and/or hand-annotation of mismatches between the two perception outputs. Moreover, the same methodology is applicable for "checking" the production system as well in order to identify potential flaws in it, thereby increasing the level of reliability of the production system itself.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
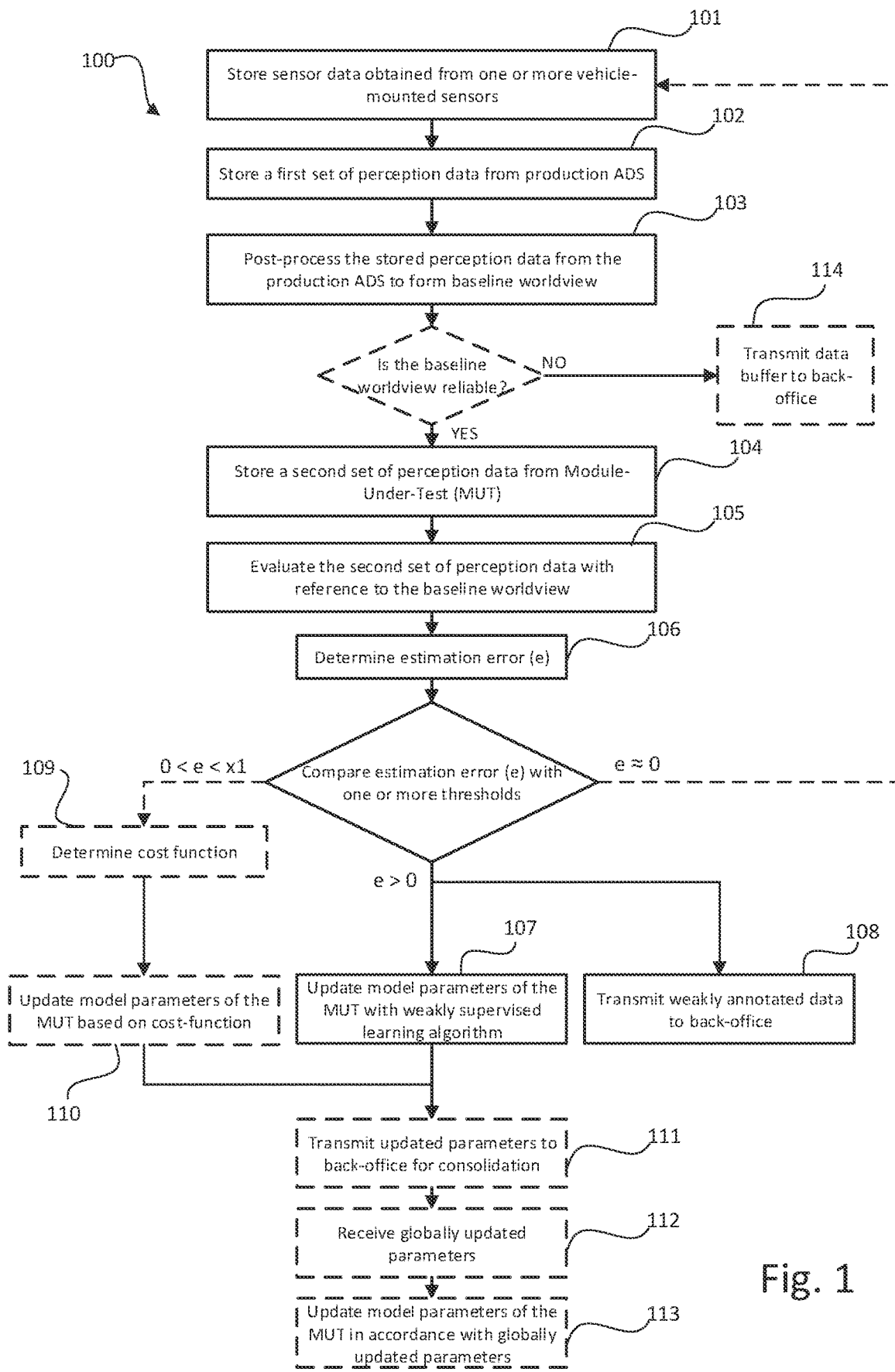
FIG. 1 is a schematic flow chart representation of a method performed by a computing system for weakly annotating data for training of a perception-development module of a vehicle in accordance with an embodiment of the present invention, where the vehicle is equipped with an Automated Driving System (ADS).

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 is a schematic flow chart representation of a method 100 performed by a computing system for performance evaluation and for weakly annotating data for training/updating of a perception-development module of a vehicle in accordance with an embodiment of the present invention. The method 100 may also be understood as a method performed by an in-vehicle computing system for weakly supervised learning of a perception-development module. The vehicle is further equipped with an Automated Driving System (ADS). The term "perception-development module" may be understood as "Module Under Test" (MUT), meaning that is a "new" (under development) software and/or hardware perception feature. The perception feature may for example be an object detection feature, an object classification feature, an object state estimation feature, a road reference estimation feature, a free-space estimation feature, a road friction estimation feature, an object trajectory estimation feature, a target/object tracking feature, and/or drivable area estimation feature. In other words, the perception-development module may in the present context be understood as software and/or hardware configured to generate a perception output, where the module is currently "under development", and not yet "in production" (e.g. not verified/validated).

The method 100 comprises storing 101, during a time period, sensor data obtained from one or more vehicle-mounted sensors. The vehicle-mounted sensors may be represented by any arbitrary sensors adapted to sense and/or perceive the vehicle's surroundings and/or whereabouts, and may e.g. refer to one or a combination of one or more of radar, LIDAR, sonar, camera, navigation system e.g. GPS, odometer and/or inertial measurement units. The term obtaining is herein to be interpreted broadly and encompasses receiving, retrieving, collecting, acquiring, and so forth.

The method 100 further comprises storing 102, during the time period, a first set of perception data obtained from a perception module (may also be referred to as a perception system) of the vehicle. The perception module is configured to generate the first set of perception data based on sensor data obtained from one or more vehicle-mounted sensors during the time period. A perception module is in the present context to be understood as a system responsible for acquiring raw sensor data from on-board sensors such as cameras, LIDARs RADARs, ultrasonic sensors, navigation system e.g. GPS, odometer and/or inertial measurement units, and converting this raw data into scene understanding.

The term "storing" perception/sensor data may refer to "storing in one or more memories", "storing on-board said vehicle", "storing in one or more memories on-board said vehicle", and/or "storing digitally and/or electronically" a set of perception/sensor data, and further to "collecting" and/or "obtaining" a set of perception data. The term "set" of perception/sensor data, on the other hand, may refer to "range", "amount", "series", "continuous and/or intermittent flow" and/or "collection" of perception/sensor data, whereas "perception data" may refer to "continuously and/or intermittently collected perception data". Furthermore, the term "perception" data may refer to "surroundings assessment" data, "spatial perception" data, "processed sensory" data and/or "temporal dependencies" data, whereas perception "data" may refer to perception "information" and/or "estimates". The term "obtained" from a perception module, on the other hand, may refer to "derived" from a perception model and/or "based on output data" from a perception module. whereas perception module configured to "generate the set of perception data" may refer to perception module/system adapted and/or configured to "estimate the surroundings of said vehicle", "estimate at least a portion of surroundings of said vehicle", "determine surroundings of said vehicle", "interpret sensory information relevant for the autonomous manoeuvring of said vehicle", and/or "estimate surroundings of said vehicle and make model predictions of future states of the surroundings of said vehicle".

The phrase storing "during" a time period may refer to storing "for" a time period, whereas time period "ranging" from a first time point to a second time point may refer to time period "extending" and/or "taking place" from a first time point to a second time point. "Time period" may refer to "pre-determinable time period" and/or "predetermined time period". "Time point", on the other hand, may refer to "point in time", whereas "from a first time point to a second time point" may refer to "from a first time point to a subsequent second time point".

Further, the method 100 comprises, forming 103, by post-processing the stored 101 first set of perception data, a baseline worldview. The baseline worldview comprises information indicative of a scenario in the surrounding environment of the vehicle during the time period. A scenario may be a momentary scene at a point in time during the time period including the positions of detected objects, object classes/types, positions of lane markers, extensions of lane markers, free-space detections, and/or trajectories of detected objects. It should be noted that this list merely serves to exemplify the parameters included in a "scenario" and may include other parameters detectable by the vehicle's perception module as readily understood by the skilled person in the art.

Figure 2:
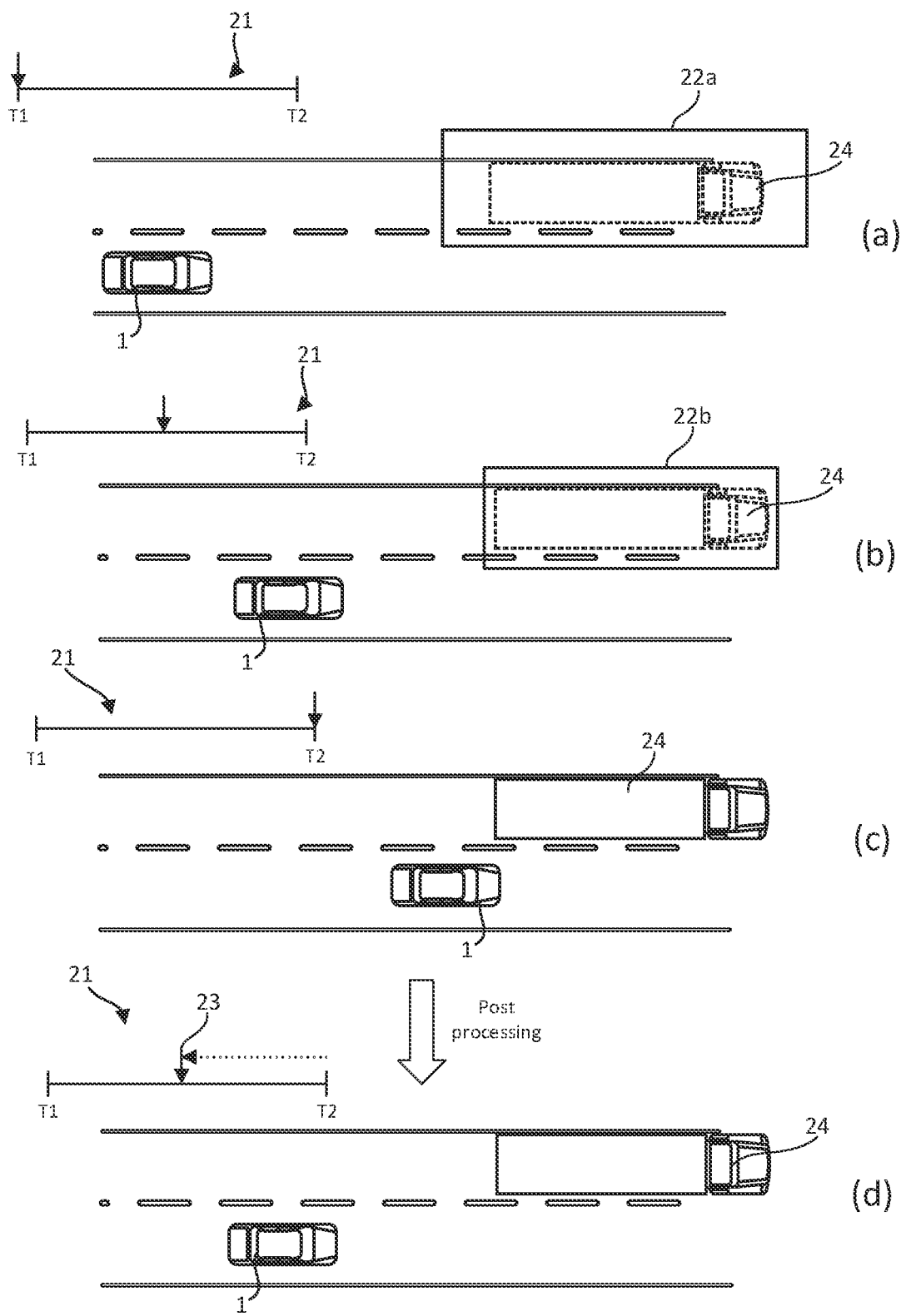
FIG. 2 is a schematic top-view illustration of a post-processing method in accordance with an embodiment of the invention in the form of a series of scenes depicting temporal development of vehicle approaching an object.

The post-processing step 103 will now be further exemplified in reference to FIG. 2, which depicts a series (a)-(d) of schematic top-view illustrations of a vehicle 1 moving a road portion towards an external object 24. Each illustration is associated with a point in time within the time period 21 ranging from a first moment in time T1 to a second moment in time T2.

In the first illustration (a) the vehicle 1 (may also be referred to as ego-vehicle 1) is moving towards an external object, here in the form of a truck 24, that is traveling in the same direction on an adjacent lane on the road portion. However, due to the distance to the truck 24, the vehicle's perception system/module may not be able to determine, with a sufficiently high level of accuracy, the position of the external object, and to classify it as a truck. This is indicated by the box 22a enclosing the truck 24, which serves to schematically indicate the "uncertainties" of the detection and classification.

At a subsequent moment in time, i.e. illustration (b) of FIG. 2, the vehicle 1 is closer to the external object, and the uncertainties regarding the external object's 24 position and class/type are reduced, as indicated by the reduced size of the box 22b as compared to the first box 22a.

At yet another subsequent moment in time, i.e. illustration (c) of FIG. 2, the vehicle's 1 perception system/module is able to accurately determine the external object's 2 position and classify it as a truck 2. More specifically, the ego-vehicle 1 is now sufficiently close to the truck 2 to be able to classify it and estimate the truck's position on the road with a higher level of accuracy as compared to when the ego-vehicle 1 was located further away from the truck.

Then, by means of a suitable filtering technique and based on the temporal development of the "scenario", one is able to establish a "baseline worldview" at an intermediate point 23 in time between T1 and T2, as indicated in the bottom illustration in FIG. 2, i.e. in illustration (d) of FIG. 2. In more detail, the filtering may for example be based on the temporal development of the trajectories, positions, etc. in combination with predefined models (e.g. motion models) of the vehicle 1 and external objects 2. This established baseline worldview may subsequently used as a "ground truth" for training and/or validation of various perception output, and in particular for training and/or validation of the output obtained from the perception-development module. Thus, in some embodiments, the baseline world-view constitutes a ground truth for the second set of perception data.

In accordance with some embodiments, the step of forming 102 the baseline worldview comprises determining, based on post-processing a portion of the first set of perception data ranging back from the second time point to an intermediate time point between the first time point T1 and second time point T2 the baseline worldview indicative of the surrounding environment of the vehicle. The baseline worldview accordingly being conditional on the portion of the first set of perception data. Moreover, in accordance with some embodiments, the post-processing of the portion of the first set of perception data comprises running the portion of the first set of perception data through a backwards filter. Here, the backwards filter is configured to align a set of perceptive parameters of the first set of perception data at the intermediate time point based on a development of the state(s) of the set of perceptive parameters from the intermediate time point to the second time point T2.

In other words, with the increased knowledge of vehicle 1 surroundings as time passes from the intermediate time point 23 to the second time point T2 and by analyzing data in reverse temporal direction, one may be able to determine, with a higher level of accuracy, the "state" (i.e. classes, positions, trajectories, etc.) of the objects in the vehicle's 1 surroundings at the intermediate time point, than it was able to do at "run-time". In more detail, the post processing may for example comprise running the first set of perception data through a backwards filter configured to align e.g. the objects current and predicted future states with what happened in the future—i.e. from the intermediate time point to the second time point T2. The post-processing may include further processing steps than running it through a backwards filter. More specifically, the post-processing may include fusion of data from various sensors, as well as applying backward and forward filtering on the fused information. Suitable filters for this purpose may for example be Particle filters or different types of Kalman filters (e.g. extended Kalman filters).

Reverting back to FIG. 1, in some embodiments, the method 100 may further comprise checking a reliability of the formed 103 baseline worldview. The reliability check may be performed as a by-product of the post-processing of the outputs of all sensors in the vehicle in an analogous manner as the post-processing 103 of the output from the perception module of the production platform. If the baseline worldview fails the reliability check, the entire associated scenario may be stored as a scenario for development of the perception module of the production platform, by transmitting the stored 101 sensor data and the stored 102 set of perception data to the remote entity, where it can be manually analysed.

However, in some embodiments, the post-processing 103 may be configured to inherently generate an indication of the reliability of the baseline worldview. In more detail, the post-processing module generates the baseline worldview by processing the data produced by production perception system over a time interval, e.g., [T1, T2] as depicted in FIG. 2. Going along with the object detection example of FIG. 2. During this time period [T1, T2], the perception algorithms (used by the platform perception system) may also output the level of confidence on their detections. For example, an object detection algorithm may indicate that the probability of the object being a truck is 85%, and uncertainty estimate of the position of the truck at each time stamp. This information may subsequently be used to estimate the degree to which one can trust on the baseline worldview. For instance, if the object in front of vehicle 1 in FIG. 2 is classified as a truck with confidence level of 50% during the time period T1 to T2, a post-processing of its trajectory cannot produce a reliable baseline worldview as the level of confidence on its object class is too low (e.g. below some threshold) during the entire time interval. However, if it were classified as a truck with probability of 90%, the post-processing of this information would generate a more "reliable" baseline worldview. One can have the same line of reasoning for the uncertainty estimates on the trajectory of the detected objects as well as other perceptive parameters as exemplified herein.

Another example of how to measure the degree of reliability (or precision) of the baseline worldview is to measure the deviation of e.g. a post-processed trajectory of a detected object, from its instantaneous detections before post-processing. A larger deviation consequently means that the baseline worldview is less reliable.

This provides additional technical advantages as any discrepancy would capture a scenario where it would be difficult for the underlying models (of the production platform) to make a concrete prediction/estimate/reading. Thereby, one would basically be capturing cases of high uncertainty (uncertainty of the external environment). These cases are useful for training of future perception models as it is (likely) a difficult environmental scenario. Thus, one may consider such scenarios to be so-called "corner-cases" for perception development and by storing these one could speed up the development of future high-performance systems. This reliability check of the baseline worldview may advantageously be performed prior to any evaluation 105 of the second set of perception data in order to avoid propagating errors from the perception module of the production platform to the perception-development module. Thus, in some embodiments, the evaluation 105 of the second set of perception data with reference to the baseline worldview is only performed if the baseline worldview passes the reliability check.

The method 100 further comprises storing 104 a second set of perception data from the perception-development module. The perception-development module is configured to generate the second set of perception data based on a perception model and sensor data obtained from one or more vehicle-mounted sensors during the time period. The second set of perception data is indicative of at least one perceptive parameter of the surrounding environment of the vehicle during at least a moment in time within the time period. For example, the second set of perception data may comprise a set of bounding boxes indicating a position and classification of a set of external objects (e.g. one or more vehicles) in the surrounding environment of the vehicle.

The term "perception model" is in the present context to be understood as a software algorithm configured to receive input in the form of sensor data (raw or having some level of pre-processing) and to therefore generate an output comprising a representation of at least a portion of the surrounding environment of the vehicle. The perception model may for example be in the form of a neural network, and the model parameters may accordingly be in the form of network weights.

The sensor data, the first set of perception data, and the second set of perception data may for example be stored or saved in one or more data buffers. The first and second sets of perception data may, as mentioned, for example be detected objects or objects' states and/or vehicle localization, and/or statistical and physical model predictions of future states, derived continuously and/or intermittently from a first time point T1 to a second time point T2. The time period—and correspondingly the length of the optional data buffers—may be of any arbitrary size deemed feasible, e.g. in consideration of data capacity restraints and/or characteristics of the ADS, and may for instance range from under a second up to several minutes, or more preferred, from a few seconds up to less than a minute.

Further, the method 100 comprises evaluating 105 the second set of perception data against the formed 103 baseline worldview in order to identify a match between the perceptive parameter of the second set of perception data and a corresponding perceptive parameter in the baseline worldview. In other words, the evaluation 105 may be construed as a comparison step between the second set of perception data and the formed baseline worldview so to identify a level of matching between one or more perceptive parameters (e.g. object positions) in the second set of perception data and the corresponding perceptive parameters in the baseline worldview. Thus, the term "evaluating" the second set of perception data against the formed baseline worldview as used herein may be understood as "processing" the second set of perception data and the formed baseline worldview in order to identify a match between the perceptive parameter of the second set of perception data and a corresponding perceptive parameter in the baseline worldview.

Stated differently, a purpose of the evaluation 105 is to match an object detected based on second set of perception data with one object from the base line world view both corresponding to one unique object in the real world. After the corresponding objects from the two sets of perception data are matched together, the next step is to compare their perceptive parameter(s) (e.g. position, speed, heading, etc.) and evaluate the performance of MUT.

Figure 4:
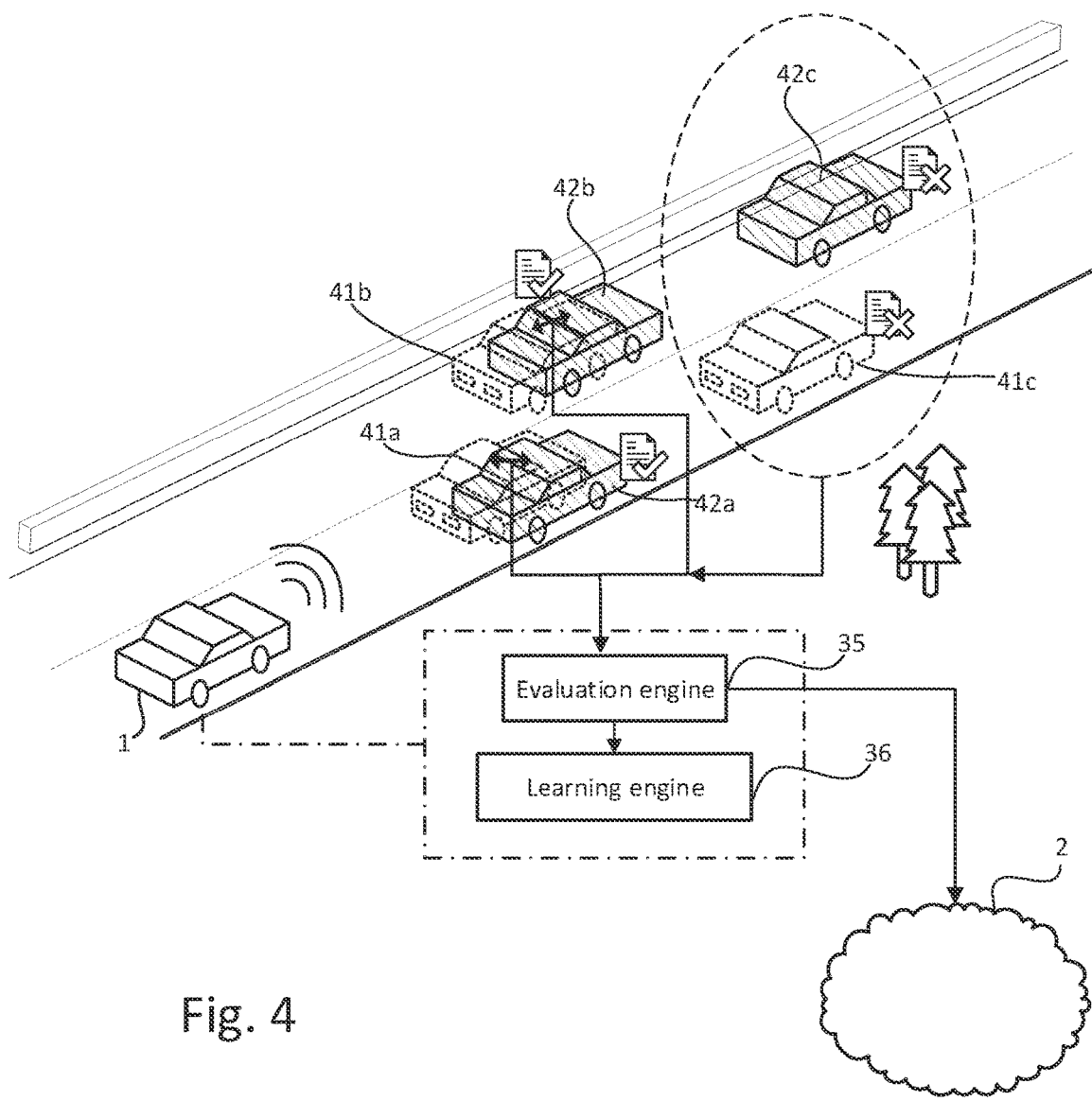
FIG. 4 is a schematic perspective view of an evaluation process for identifying a match between a baseline worldview and an output from a perception-development module in accordance with an embodiment of the present invention.

In accordance with an illustrative example, the evaluation 105 may include comparing the position of an identified vehicle in the second set of perception data with the position of the corresponding vehicle in the baseline worldview (e.g. as illustrated in FIG. 4). The matching 104 process will be further exemplified and elucidated with reference to FIGS. 4-6.

Further, if a match between the perceptive parameter of the second set of perception data and the corresponding perceptive parameter in the baseline worldview is identified, the method 100 further comprises determining 106 an estimation error (e) of the matched perceptive parameter of the second set of perception data in reference to the corresponding perceptive parameter in the baseline worldview. The estimation error (e) may be construed as a parameter indicative of how well the "matching" perceptive parameters correlate. In other words, the estimation error (e) may in some embodiments be construed as the "level of matching" between two perceptive parameters.

However, if no match between the perceptive parameter of the second set of perception data and the corresponding perceptive parameter in the baseline worldview is identified or if the determined 106 estimation error exceeds a threshold (e.g. a zero-value), the method 100 further comprises at least one of the following steps.

Updating 107 one or more parameters of the perception model of the perception-development module by means of a weakly supervised learning algorithm based on the sensor data used for the second set of perception data and by using the baseline worldview to weakly annotate the second set of perception.

Transmitting 108 the stored sensor data, the stored second set of perception data, and the baseline worldview as weakly annotated data to a remote entity for off-board processing.

It should be noted that the "no matching" may be also be implicitly indicated by the estimation error going towards infinity.

The threshold for the estimation error may be defined in different ways depending on the type of perceptive parameter that is being evaluated. For example, the perceptive parameter may be an object position estimation or an object occupancy estimation. The threshold may then be in the form of a "maximum lateral and longitudinal offset of closest point" between the bounding box representation of an object in the second set of perception data and the bounding box representation of the corresponding object in the baseline worldview. The term "closest point" may be understood the closest point of the detected object to the ego-vehicle. However, the threshold may also be in the form of a "maximum lateral and longitudinal offset" of any point of the two bounding box representations (e.g. bottom left corner, top right corner, etc.).

Similarly, if the perceptive parameter is a free-space estimation, the threshold may be in the form of a "maximum size" (i.e. number of area units) of a non-overlapping free-space area between the free-space area estimations of the second set of perception data and the baseline worldview. In terms of set theory this may be understood as the symmetric difference between the free-space set defined by the free-space estimation of the perception development module and the free-space set defined by the baseline worldview. Moreover, in some embodiments, there is a plurality of different thresholds associated with the free-space estimation, where the thresholds depend on where the "erroneous" portion is located relative to the ego-vehicle. In more detail, one may employ a "weight matrix" or a "weight map", where the threshold for the estimation error is lower for certain portions of the scene around the vehicle. For example, it is more important to be accurate close in front of the ego-vehicle than far away or far out on the sides of the ego-vehicle. Thus, in the updating process 107 of the perception model there are higher penalties associated with erroneous estimations in certain portions of the scene around the vehicle.

Thus, based on the above examples, it is considered to be sufficiently clear for the skilled reader how to define estimation error thresholds for various perceptive parameters as exemplified herein. Concerning the value of the threshold, this value may be set based on the type of parameter and/or based on the level of maturity of the perception-development module. The estimation error may in some embodiments be set to zero or any value above zero, meaning if there is any discrepancy between the perception-development module's output and the baseline worldview, the weak annotation step is triggered.

Moreover, if the determined 106 estimation error is below (or at) the threshold, i.e. approximately zero, the method 100 goes to a next iteration of processing the buffered data.

Further, in some embodiments, the method 100 may comprise determining 109 a cost function based on the determined 106 estimation error (e), where the cost function is indicative of a performance of the perception-development module. Stated differently, once a match between a perceptive parameter of the second set of perception data and a corresponding perceptive parameter in the baseline worldview has been identified/established, one can calculate a cost function that indicates how well the "perception-development module" performed. Moreover, in some embodiments, the cost function (may also be referred to as a loss function) is determined based on the type of perceptive parameter. In other words, one cost function may be formed/defined if the perception model of the perception-development module is an object detection algorithm while another cost function may be formed/defined if it is a lane-tracing/tracking algorithm.

Still further, once a cost-function has been determined/calculated 109, one or more parameters of the perception-development module may be updated 110 by means of an optimization algorithm (e.g. back propagation for neural networks) configured to minimize the calculated cost function.

However, in some embodiments, the determination 109 of the cost-function is only performed if the estimation error (e) between the perceptive parameter of the second set of perception data and a corresponding perceptive parameter in the baseline worldview is below or within a threshold range (e.g. [0, x1]). Thereby, one mitigates the risk of attempting to determine or calculate a cost-function in situations where it is uncertain if the perceptive parameter of the second set of perception data is incorrectly compared to the "wrong" perceptive parameter in the baseline worldview.

Moreover, in some embodiments, the evaluation 105 of the second set of perception data to the formed baseline worldview is only performed on the second set of perception data and the baseline worldview representative of a region of interest in the surrounding environment of the vehicle. For example, one may limit an "area" within which the evaluation process 105 is performed, such that one only compares the two datasets represented an area within a specific viewing frustum or within a certain distance from the vehicle. Thereby, objects that are further away from the vehicle may be ignored as they are more likely to be associated with higher uncertainties and therefore more difficult to "match". Similarly, one may ignore "less relevant" areas during the evaluation 105, such as e.g. opposing lanes on a controlled access highway. Moreover, the region of interest may be set dynamically depending on one or more vehicle parameters, such as e.g. the speed of the ego-vehicle. For example, if the vehicle is moving at low speeds (e.g. <20 km/h), the region of interest may be set to include a smaller area around the ego-vehicle as compared to a corresponding situation when the vehicle is traveling at high speeds (e.g. >100 km/h). This may consequently result in reduced processing power requirements for the evaluation process 105.

In some embodiments, the method 100 further comprises transmitting 111 the one or more updated parameters of the perception model of the perception-development module to a remote entity. The remote entity may for example be a central system or a cloud system capable of receiving and transmitting data to a fleet of ADS-equipped vehicles. Furthermore, in some embodiments, the method 100 comprises receiving 112 a set of globally updated parameters of the perception model of the perception-development module from the remote entity. The set of globally updated parameters are accordingly based on information obtained from a plurality of vehicles comprising the perception-development module. Once, the set of globally updated parameters have been received 112, the method 100 may further comprise updating 113 the perception model of the perception-development module based on the received set of globally updated parameters.

In other words, the remote entity (may also be referred to as the "back-office"), consolidates the "learned" parameters of each vehicle in the entire fleet of vehicles, and pushes an update of the perception-development module to each vehicle in the fleet. Thereby, one may utilize an entire fleet of production vehicles (instead of a few specialized "test-vehicles") to develop and verify various perception features associated with an ADS. Moreover, since the data that is being transmitted between the vehicles and the remote entity is in the form of "model parameters" (e.g. network weights) instead of e.g. raw or processed sensor data, advantages in terms of bandwidth requirements, data storage, and data security, data privacy, and compliance with data regulations are readily achievable. The "back-office" may in the present context be understood as a central entity responsible for the management and maintenance of the ADSs deployed in the vehicle fleet.

Executable instructions for performing these functions are, optionally, included in a non-transitory computer-readable storage medium or other computer program product configured for execution by one or more processors.

Accordingly, the present invention provides a time-efficient and cost-effective solution for developing consecutive releases of perception features for autonomous vehicles. In more detail, the present inventors realized that once there is a "first" ADS released and deployed in a fleet of production vehicles, one can capitalize on the huge efforts (in terms of time and financial investments) associated with this first release, in order to develop consecutive releases of various perception features. In more detail, it is herein suggested to use the vehicles "out in traffic" (i.e. production vehicles) to develop, test and verify new software and hardware. The solution proposed herein may be understood as a scheme of federated learning, effectively using learning at the edge (in each production vehicle) and then to potentially consolidate the learnt parameters/weights in a central/cloud unit. Stated differently, the present invention provides a solution that utilises the production vehicles to develop new perception features related to new sensor hardware as well as new algorithms for existing sensors by using federated learning.

As mentioned in the foregoing background section, perception algorithms for autonomous driving, such as for example "vision" algorithms, are dependent on massive sets of hand-labelled (annotated) data for training of the machine learning models. Creating such hand-labelled datasets is not only very expensive but also extremely time consuming, especially when domain expertise is required. The present invention aims to mitigate these problems by automatically selecting the most informative part of the data for annotation as well as enabling automatic weak annotations and thereby alleviate the requirements of massive hand-labelled datasets.

It is therefore proposed herein to use the perception platform deployed in the fleet of production vehicles to identify and weakly annotate sets of data that can substantially improve the performance of the new generations of perception features related to new sensor hardware as well as new algorithms for existing sensors. To achieve this, it is proposed that the vehicle's own worldview is supplied as a baseline towards which the output of the software- (SW) or hardware- (HW)-under-development is compared. In case of a large discrepancy between the baseline worldview and perceived worldview by the module-under-test, the data is weakly (i.e., "inaccurately") annotated by the baseline worldview. Such weakly annotated data may subsequently be used to update the SW parameters of the "perception model" in the module-under-test in each individual vehicle, or to be transmitted to the "back-office" for off-board processing or more accurate annotations. The herein proposed methods and system effectively enable cost-efficient data annotation for the "next generation" perception modules, thereby reducing costs and time-efforts needed for developing future products/systems.

In other words, the present inventors realized that once the ADS in the production vehicles is deployed, it can be assumed that it has been proven sufficiently safe (at least under certain conditions) including the perception and its performance Therefore, a learning regime is herein proposed, where the worldview of the ADS is post-processed to construct a "baseline", towards which the output of the software-/hardware-under-development can be compared. Through this comparison one can setup a system to automatically annotate the worldview for the module-under-development and use this weakly annotated data for weakly supervised learning locally in each production vehicle, or to send the annotated data to the "back-office" for offline processing or possibly for more accurate annotation.

Figure 3:
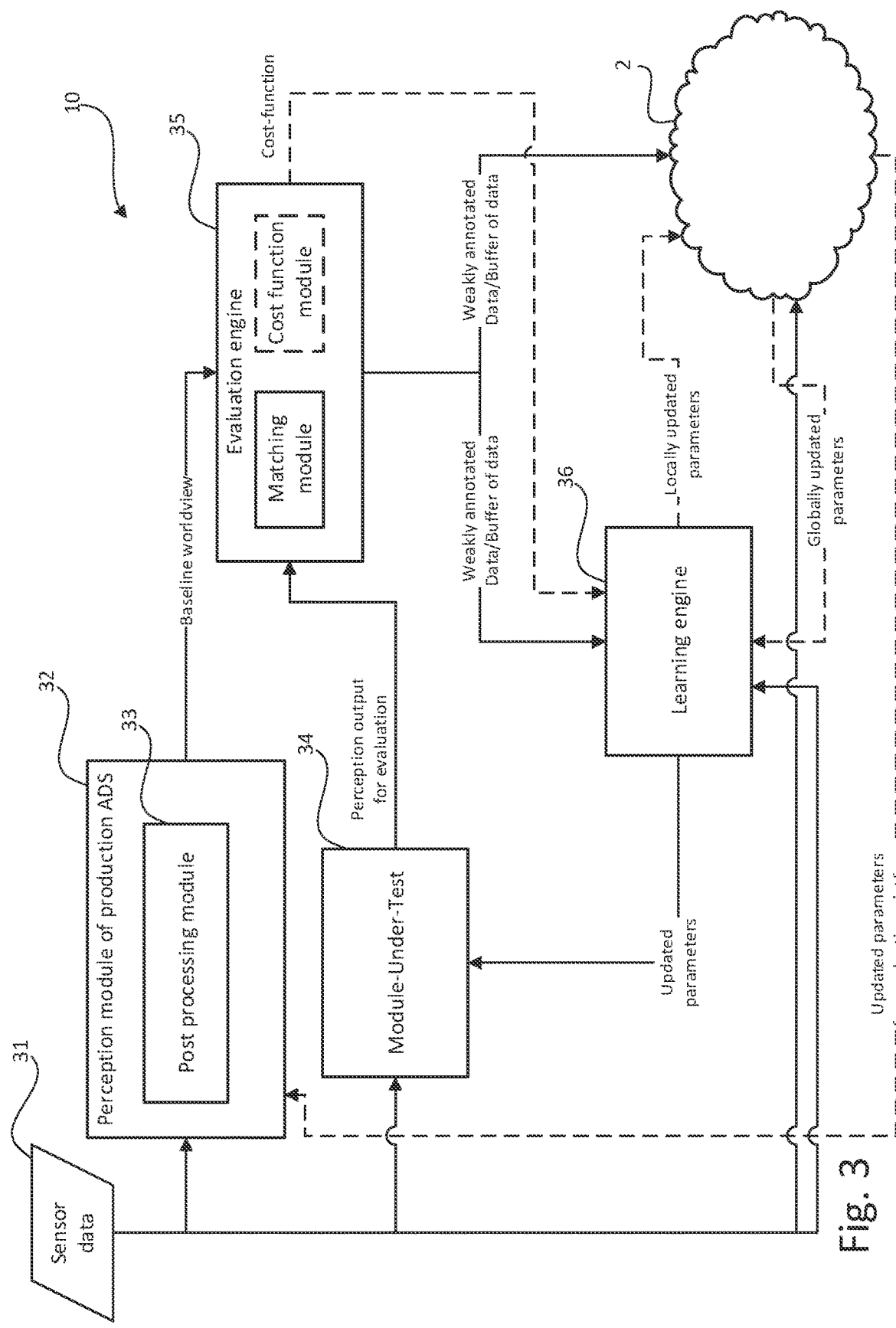
FIG. 3 is a schematic block diagram representation of a system for weakly annotating data for training of a perception-development module of a vehicle in accordance with an embodiment of the present invention.

FIG. 3 is a schematic block diagram representation of a system 10 for weakly annotating data for training of a perception-development module of a vehicle, where the vehicle is equipped with an Automated Driving System (ADS). In general, FIG. 3 depicts the flow of information through exposure to an event in the vehicle to the transmission and subsequent consolidation in the "back-office" 2. The system 10 comprises control circuitry configured to perform the functions of the methods disclosed herein, where the functions may be included in a non-transitory computer-readable storage medium or other computer program product configured for execution by the control circuitry. However, in order to better elucidate the present invention, the control circuitry is represented as various "modules" in FIG. 3, each of them linked to one or more specific functions.

It should be noted that the "perception output for evaluation" that is compared in the "evaluation engine" 35 could be any type of perception output e.g. objects, their states, free-space (the absence of objects), lanes, road position, driveable area, and combinations thereof. Free-space areas may in the present context be understood as areas in the surrounding environment of the ego-vehicle absent of objects (e.g. other vehicles, pedestrians, barriers, animals, bicycles, static objects, etc.).

The system 10 comprises control circuitry configured to store, during a time period, sensor data 31 obtained from a set of vehicle-mounted sensors configured to monitor a surrounding environment of the vehicle. The sensor data 31 may for example output from one or more of a RADAR device, a LIDAR device, a camera, and ultrasonic sensor, and so forth. The control circuitry is further configured to store a first set of perception data obtained from the perception module 32 of the vehicle. The perception module 32 is configured to generate the first set of perception data based on the sensor data 31 obtained from one or more vehicle-mounted sensors during the time period. A "perception module" (i.e. the perception system of the production platform) is in the present context to be understood as a system responsible for acquiring raw sensor data from onboard sensors such as cameras, LIDARs and RADARs, ultrasonic sensors, and converting this raw data into scene understanding including state estimations and predictions thereof (i.e. to a "worldview").

As mentioned the data sets may for example be stored or saved in a data buffer (not shown), where the first and second sets of perception data may be understood as data indicative of the vehicle's surroundings. This may for example be detected objects or objects' states and/or vehicle localization, and/or statistical and physical model predictions of future states, derived continuously and/or intermittently from a first time point T1 to a second time point T2. The time period—and correspondingly the length of the optional data buffer—may be of any arbitrary size deemed feasible, e.g. in consideration of data capacity restraints and/or characteristics of the ADS, and may for instance range from under a second up to several minutes, or more preferred, from a few seconds up to less than a minute.

Further, the system 10 comprises a post-processing module 33 for forming a baseline worldview indicative of a scenario in the surrounding environment of the vehicle during the time period. The baseline worldview is formed based on the perception data generated by the perception module 32 of the production ADS. It should be noted that the term "forming, by post-processing the first set of perception data" does not necessarily mean that all of the stored data is post-processed, but should be construed as that at least a portion or at least a range of the stored perception data is post-processed.

Still further, a second set of perception data is generated by a perception-development module (i.e. a Module Under Test, MUT) 34. This second set of data is obtained or received by an "evaluation engine" 35 of the system 10. The perception-development module 34 is configured to generate the second set of perception data based on a perception model and sensor data obtained from one or more vehicle-mounted sensors during the time period. The second set of perception data may be understood as a "perception output" from the MUT 34, and it is indicative of a perceptive parameter of the surrounding environment of the vehicle. For example, the MUT 34 may comprise a lane tracing/tracking algorithm or a road geometry estimation algorithm. Accordingly, the output from the MUT may be a road reference feature estimation, such as e.g. a representation of the road or lane geometry in the surrounding environment of the vehicle during the time period.

Moreover, the input to the perception-development module 34 could be any combination of existing production sensors, their raw output, the raw detections or any more or less processed state in the chain. It could also be any combination of newly mounted sensors and their output (i.e. sensor output that is not used to generate the baseline worldview). For example, if one would want to test and evaluate an object detection algorithm that is based on a different type of input data from a new type of sensor as compared to the "production platform's" object detection algorithm.

The evaluation engine 35 is configured to evaluate the second set of perception data in reference to the formed baseline worldview in order to identify a match between one or more perceptive parameters of the second set of perception data and the corresponding perceptive parameters in the baseline worldview. In other words, the evaluation engine 35 is configured to try to match the "perception-output for evaluation" with the corresponding features in the baseline worldview. If a match is found, the evaluation engine 35 is further configured to derive an estimation error.

It should be noted that the outputs that are compared in the "evaluation engine" 35 could be any type of perception output e.g. objects, their states or free-space (the absence of objects), lanes, road position, and driveable area, or combinations thereof.

Accordingly, if a match between the perceptive parameter of the second set of perception data and the corresponding perceptive parameter in the baseline worldview is identified, an estimation error of the matched perceptive parameter of the second set of perception data in reference to the corresponding perceptive parameter in the baseline worldview is determined. However, if no match between the perceptive parameter of the second set of perception data and the corresponding perceptive parameter in the baseline worldview is identified or if the estimation error exceeds a threshold, the evaluation engine may transmit a signal to a learning engine 36.

This transmitted signal may comprise an instruction to update one or more parameters of the perception model of the perception-development module 34 by means of a weakly supervised learning algorithm based on the sensor data used for the second set of perception data and by using the baseline worldview to weakly annotate the second set of perception data. Alternatively or additionally, the system may be configured to transmit the weakly annotated data to the back-office 2 for offline processing (e.g. manual annotation or analysis). The data transmitted to the back-office may advantageously be used to improve the production platform's perception module 32 as well.

Furthermore, in some embodiments, the evaluation engine 35 is configured to evaluate the obtained second set of perception data in reference to the baseline worldview in order to determine a cost function. In more detail, the cost function is calculated based on the determined estimation error, and is indicative of a performance of the perception-development module.

The determined cost function may then be transmitted to the learning engine 36, which is configured to update one or more parameters of the perception model of the perception-development module 34 by means of an optimization algorithm (e.g. back propagation for neural networks) configured to minimize the calculated cost function.

Moreover, the learning engine 36 is further configured to transmit the one or more locally updated parameters to a remote entity 2, where they are consolidated with updates received from other vehicles in the fleet, and then transmitted back to the learning engine 36 as a set of globally updated parameters. Then, the learning engine 36 may update the perception model of the perception-development module 34 based on the received set of globally updated parameters.

The learning platform as proposed herein exposes the vision/perception baseline locally inside the platform such that the comparison/cost function used for evaluation or learning of the perception-development module 34 can be customised according to the present need. Further, the platform is proposed to include the redundant computational power necessary to achieve the comparison as well as the learning steps.

In summary, the system 10 provides a means for weakly annotating data for training of a perception-development module of a vehicle by comparing the output from the "Module-under-test" 34 with the baseline worldview (serving as a ground truth). The comparison may, in some embodiments, be evaluated through a customisable cost function. If the value of the cost function is found to be over a set threshold or if a mismatch is found between the two outputs (e.g. if it is impossible to match parts of the world views to get a reliable value for calculating a cost function), the baseline worldview can be used as a weak annotation of the worldview for the module-under-test 34. It is called weak annotation of the worldview due to possible uncertainties and inaccuracies in baseline worldview in comparison to a hand-labelled worldview. The weekly annotated data may subsequently used in two different ways:

- The weakly annotated data can be fed to a weakly supervised learning algorithm in each individual vehicle. Thereby, one can update the perception model parameters locally and transmit the updated parameters to the "back-office" for consolidation.
- The weakly annotated data can be sent to the back-office for more accurate annotation or analysis which can also be used to improve the production platform.

The choice between these two options may for example depends on the level of confidence of the baseline worldview, which can be obtained as a by-product of a post-processing of the outputs of all sensors in the production vehicle. If the discrepancy between the "baseline worldview" and post-processed sensor worldviews are in regions where the baseline worldview has inherently low confidence, or if the "perception development module" 34 is very immature it may benefit a lot from manually annotated data in back-office. However, in comparison to conventional data annotation processes where massive datasets are used and a great deal of time and effort is spent on review and analysis in order to find the "suitable" datasets for supervised learning. The herein proposed solution can also be utilized to automatically provide high-quality data sets for offline processing (e.g. hand-labelling), which drastically decreases the required time and effort for development of new perception models for autonomous driving applications.

From a more holistic perspective, the methods and systems as disclosed herein could be used to develop and launch new perception software or hardware versions in accordance with the following stages. Firstly, there is a learning stage or phase and a consolidation phase where the new module is updated according to the flows depicted in FIGS. 1 and 3. Once as sufficient level of maturity is reached, the consolidated model parameters are pushed to the vehicle fleet for validation. In this validation the step, the "learning part" of the process is not executed, i.e. in reference to FIG. 3, the learning engine 36 is "short-circuited". Thus, only the evaluation part of the process is used. Then, if the new module passes the validation phase (i.e. the fail-rate is sufficiently low) in each vehicle of the fleet of vehicles, the final SW can be launched. However, if the validation fails, one can return to the beginning and start a new iteration of the process.

FIG. 4 is a schematic perspective view of a matching process for matching a second set of perception data to a formed baseline worldview. In the illustrated example, the second set of perception data comprises an object detection estimation, and an example of how a matching between the two datasets outside of a threshold may be propagated to the evaluation and learning engines 34, 36 either to update the model parameters of the perception-development module of the vehicle 1 or to transmit weakly annotated data to the "back-office" 2. The determined estimation error (as indicated by the double-headed arrows) may for example a difference in the location between the bounding boxes around the detected objects 41 indicated in the second set of perception data and the bounding boxes around the corresponding objects 42 in the baseline worldview.

Moreover, FIG. 4 also serves to elucidate the matching process described in the foregoing. Here, a match between the perceptive parameters (objects) of the second set of perception data and the corresponding perceptive parameters (objects) in the baseline worldview was identified for two of the vehicles 41a-b detected by the perception-development module, while no match could be identified for a third vehicle 41c. For the identified matches, an estimation error is determined and compared against a threshold. In the case where no match could be identified/established (i.e. the objects within the broken-line circle in FIG. 4), one can define the estimation error for this perceptive parameter 41c as "infinite" or some "maximum value".

For example, if the second set of perception data is indicative of a blue vehicle and a red vehicle in front of the ego-vehicle, the matching process ensures that the red vehicle is matched to the corresponding red vehicle in the baseline worldview and the blue vehicle is matched to the corresponding blue vehicle in the baseline worldview. Otherwise, the perception model of the perception-development module may be trained with erroneous data (based on erroneous conclusions), which would decrease the performance of the perception-development module. Thus, as illustrated in FIG. 4, the third vehicle 41c as detected by the perception-development module was not sufficiently close to any vehicle in the baseline worldview for the evaluation engine to identify any match.

As none of the objects in the two perception outputs resulted in a perfect match, it may be concluded that the perception model of the perception development module generates an inaccurate representation of the surrounding environment. Thus, in order to update one or more parameters of the perception model, one can utilize a weakly supervised learning algorithm, where the sensor data used for generating the second set of perception data and the baseline worldview together form a "training dataset" or a "training example". More specifically, the sensor data used for the second set of perception data forms the "input object" and the baseline worldview is used as weakly annotated data in order to form a "supervision signal" (i.e. "desired output").

Figure 5:
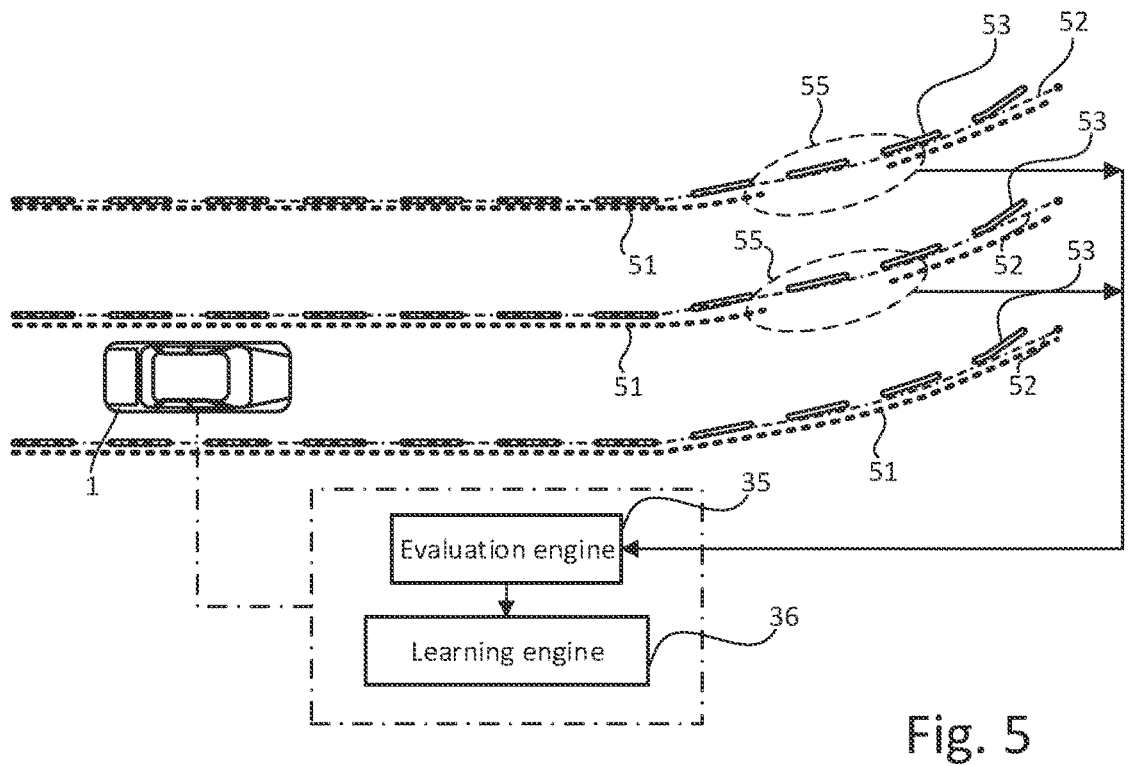
FIG. 5 is a schematic top view of an evaluation process for identifying a match between a baseline worldview and an output from a perception-development module in accordance with an embodiment of the present invention.
Figure 6:
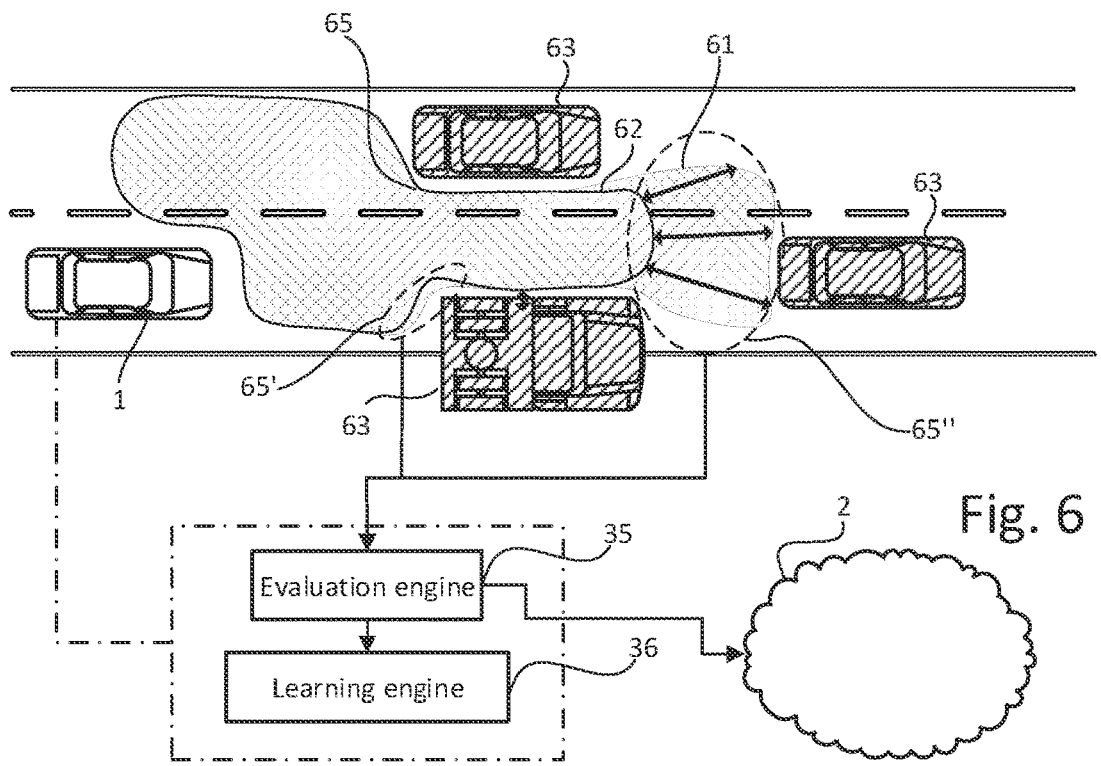
FIG. 6 is a schematic top view of an evaluation process for identifying a match between a baseline worldview and an output from a perception-development module in accordance with an embodiment of the present invention.

FIGS. 5 and 6 show the corresponding evaluation processes for perception models in the form of lane geometry estimations algorithms (FIG. 5) and free-space detection algorithms (FIG. 6). In more detail, FIG. 5 is a schematic top-view illustration of a vehicle according to an embodiment of the present invention traveling on a road portion. The road portion has two lanes, and curves to the left in front of the vehicle 1. The "true" lane markings are indicated by reference numeral 53, the baseline worldview's lane geometry estimation is indicated by reference numeral 52, while the perception-development module's lane geometry estimation is indicated by reference numeral 51. Analogously as before, a mismatch between the lane traces of the perception-development module's output and the baseline worldview is identified, and the baseline worldview is utilized as weakly annotated data for updating one or more parameters of the perception model of the perception-development module by means of a weakly supervised learning algorithm or for transmitting to the back-office. Here the estimation error 55 is indicated as a difference between the locations/geometries of the lane geometry estimations 51, 52. In more detail, the perception-development module's lane geometry estimation 51 failed to generate a representation of the lane markers in some areas (indicated by reference numeral 55). Moreover, in some embodiments, the evaluation is performed in the image plane on a pixel level. Thereby, one can evaluate and train camera software directly on the pixel level.

Further, FIG. 6 is a schematic top-view illustration of a vehicle according to an embodiment of the present invention traveling on a road portion. The road portion has two lanes, and three external objects 63 in the form of two cars and a tractor located in front of the vehicle. The free-space estimation made by the production platform, i.e. the free-space estimation of the baseline worldview is indicated by reference numeral 62, while the free-space estimation of the perception-development module is indicated by reference numeral 61. The estimation error 65', 65" is, in the illustrated example, simply derived by a measurement or metric indicative of the non-overlapping parts of the two free-space estimations 61, 62. In terms of set theory this may be understood as the symmetric difference between the free-space set defined by the free-space estimation 61 of the perception development module and the free-space estimation 62 defined by the baseline worldview.

Analogously as for the example embodiments discussed above in reference to FIGS. 4 and 5, if the mismatching or estimation error 65' 65" is above a threshold, the stored data is used for training the perception model of the perception development module or transmitted to the back-office 2 for further analysis. However, as indicated in FIG. 6, the perception-development module's free-space estimation 62 is associated with two different estimation errors 65', 65", where the smaller deviation from the "ground truth" 61 is indicated by reference numeral 65' and the larger deviation is indicated by reference numeral 65". In this example, the larger deviation or estimation error 65" is considered to be above some "maximum error threshold" and the data is sent to the back-office 2 for hand-annotation/further analysis. The smaller deviation or estimation error 65' is on the other hand considered to be below this "maximum threshold" and can therefore be used to locally update the perception model in accordance with the foregoing embodiments.

As mentioned, free-space areas may in the present context be understood as areas in the surrounding environment of the ego-vehicle absent of objects (e.g. other vehicles, pedestrians, barriers, animals, bicycles, static objects, etc.). Thus, the location of free-space areas may be understood as estimates of areas absent of external objects (static and dynamic objects). One can consider an estimation of "driveable area" in an analogous fashion, where in addition to the estimation of areas absent of objects (as in the case of free space) the estimation also includes the presence of a road surface.

Figure 7:
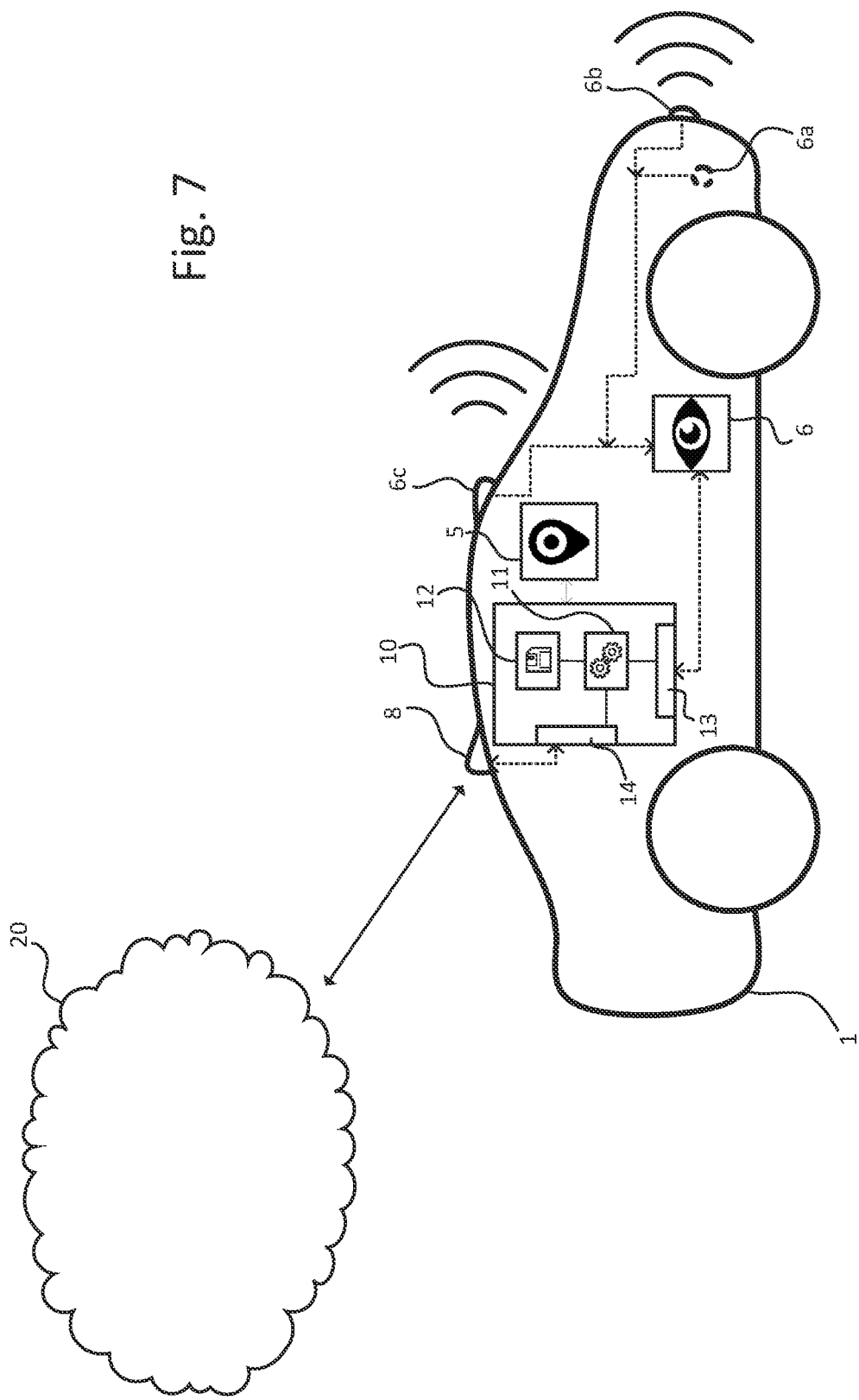
FIG. 7 is a schematic side-view of a vehicle comprising a system for weakly annotating data for training of a perception-development module of a vehicle in accordance with an embodiment of the present invention.

FIG. 7 depicts a schematic side view of a vehicle 1 comprising a system 10 for weakly annotating data for training of a perception-development module of an ADS-equipped vehicle in accordance with an embodiment of the present invention. The vehicle 1 further comprises a perception module/system 6 (i.e. the perception system of the production platform), and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception module/system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6 comprised in and/or provided on-board the vehicle 1. The surrounding detecting sensors 6 may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for weakly annotating data for training of a perception-development module of a vehicle 1 according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The control circuitry 11 is configured to store, during a time period, sensor data obtained from one or more vehicle-mounted sensors configured to monitor a surrounding environment of the vehicle. The control circuitry 11 is further configured to store, during the time period, a first set of perception data obtained from the perception module 6 (of the "production platform") of the vehicle. The perception module 6 is configured to generate the first set of perception data based on sensor data obtained from one or more vehicle-mounted sensors 6 during the time period. Furthermore, the control circuitry 11 is configured to form, by post-processing the first set of perception data, a baseline worldview indicative of a scenario in the surrounding environment of the vehicle during the time period.

The control circuitry 11 is further configured to obtain a second set of perception data from the perception-development module (not shown in FIG. 7), where the perception-development module is configured to generate the second set of perception data based on a perception model and sensor data obtained from one or more vehicle-mounted sensors 6 during the time period. The second set of perception data is indicative of a perceptive parameter of the surrounding environment of the vehicle during the time period. It should be noted that the sensor data used for generating the first set of perception data need not be the same sensor data as used for generating the second set of perception data. In some embodiments, the first set of perception data is generated based on a first set of sensor data, while the second set of perception data is generated based on a second set of sensor data. In some embodiments, first set of sensor data is the same as the second set of sensor data, while in other embodiments the second set of sensor data is a subset of the first set of sensor data. Alternatively, the first set of sensor data is different from the second set of sensor data.

Furthermore, the control circuitry 11 is configured to evaluate the obtained second set of perception data against the formed baseline worldview in order to identify a match between the perceptive parameter of the second set of perception data and a corresponding perceptive parameter in the baseline worldview. Then, if a match between the perceptive parameter of the second set of perception data and the corresponding perceptive parameter in the baseline worldview is identified, the control circuitry is further configured to determine an estimation error of the matched perceptive parameter of the second set of perception data in reference to the corresponding perceptive parameter in the baseline worldview.

Still further, if no match between the perceptive parameter of the second set of perception data and the corresponding perceptive parameter in the baseline worldview is identified or if the estimation error exceeds a threshold, the control circuitry is further configured to perform at least one of the following:

Update one or more parameters of the perception model of the perception-development module by means of a weakly supervised learning algorithm based on the sensor data used for the second set of perception data and by using the baseline worldview as ground truth for forming weakly annotated data.

Transmit the stored sensor data, the stored second set of perception data, and the baseline worldview as weakly annotated data to a remote entity for off-board processing.

Further, the vehicle 1 may be connected to external network(s) 20 via for instance a wireless link (e.g. for transmitting and receiving model parameters). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of forming the baseline worldview and obtaining the second set of perception data may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method performed by a computing system for weakly annotating data for training of a perception-development module of a vehicle, wherein the vehicle is equipped with an Automated Driving System (ADS) the method comprising:
storing, during a time period, sensor data obtained from a set of vehicle-mounted sensors configured to monitor a surrounding environment of the vehicle;
storing, during the time period, a first set of perception data obtained from a perception module of the vehicle, the perception module being configured to generate the first set of perception data based on sensor data obtained from one or more of the set of vehicle-mounted sensors during the time period;
forming, by post-processing the first set of perception data, a baseline worldview from the obtained first set of perception data, the baseline worldview being indicative of the surrounding environment of the vehicle during the time period;
storing, during the time period, a second set of perception data from the perception-development module, wherein the perception-development module is configured to generate the second set of perception data based on a perception model and sensor data obtained from one or more of the set of vehicle-mounted sensors during the time period;
wherein the second set of perception data is indicative of a perceptive parameter of the surrounding environment of the vehicle during the time period;
evaluating the second set of perception data against the formed baseline worldview in order to identify a match between the perceptive parameter of the second set of perception data and a corresponding perceptive parameter in the baseline worldview;
if a match between the perceptive parameter of the second set of perception data and the corresponding perceptive parameter in the baseline worldview is identified, the method further comprises determining an estimation error of the matched perceptive parameter of the second set of perception data in reference to the corresponding perceptive parameter in the baseline worldview;
if no match between the perceptive parameter of the second set of perception data and the corresponding perceptive parameter in the baseline worldview is identified or if the estimation error exceeds a threshold, the method further comprises:
updating one or more parameters of the perception model of the perception-development module by means of a weakly supervised learning algorithm based on the sensor data used for the second set of perception data and by using the baseline worldview to weakly annotate the second set of perception data; or
transmitting the stored sensor data, the stored second set of perception data, and the baseline worldview as weakly annotated data to a remote entity for off-board processing.

2. The method according to claim 1, wherein the baseline worldview constitutes a ground truth for the second set of perception data.

3. The method according to claim 1, wherein the perceptive parameter comprises at least one of:
an object detection estimation;
an object classification estimation;
an object state estimation;
a road reference feature estimation;
a free-space estimation;
a road friction estimation;
an object trajectory estimation; and
a drivable-area estimation.

4. The method according to claim 1, wherein the time period ranges from a first time point to a second time point, and wherein the step of forming the baseline worldview comprises:
determining, based on post processing a portion of the first set of perception data ranging back from the second time point to an intermediate time point between the first and second time points, the baseline worldview indicative of the surrounding environment of the vehicle conditional on the portion of the first set of perception data.

5. The method according to claim 4, wherein the post processing of the portion of the first set of perception data comprises:
running the portion of the first set of perception data through a backwards filter configured to align a set of perceptive parameters of the first set of perception data at the intermediate time point based on a development of the state(s) of the set of perceptive parameters from the intermediate time point to the second time point.

6. The method according to claim 1, further comprising:
determining a cost function based on the determined estimation error, the cost function being indicative of a performance of the perception-development module; and
updating the one or more parameters of the perception model of the perception-development module by means of an optimization algorithm configured to minimize the calculated cost function.

7. The method according to claim 6, wherein the cost function is determined based on the type of perceptive parameter.

8. The method according to claim 1, further comprising:
transmitting the one or more updated parameters of the perception model of the perception-development module to a remote entity;
receiving a set of globally updated parameters of the perception model of the perception-development module from the entity, wherein the set of globally updated parameters are based on information obtained from a plurality of vehicles comprising the perception-development module;
updating the perception model of the perception-development module based on the received set of globally updated parameters.

9. A non-transitory computer-readable storage medium storing one or more instructions, which when executed by one or more processors of an in-vehicle processing system, cause the one or more processors to perform the method according to claim 1.

10. A system for weakly annotating data for training of a perception-development module of a vehicle, wherein the vehicle is equipped with an Automated Driving System, ADS, the system comprising control circuitry configured to:
store, during a time period, sensor data obtained from a set of vehicle-mounted sensors configured to monitor a surrounding environment of the vehicle;
store, during the time period, a first set of perception data obtained from a perception module of the vehicle, the perception module being configured to generate the first set of perception data based on sensor data obtained from one or more of the set of vehicle-mounted sensors during the time period;
form, by post-processing the first set of perception data, a baseline worldview from the obtained first set of perception data, the baseline world-view being indicative of a scenario development in the surrounding environment of the vehicle during the time period;
store a second set of perception data from the perception-development module, wherein the perception-development module is configured to generate the second set of perception data based on a perception model and sensor data obtained from one or more of the set of vehicle-mounted sensors during the time period;
wherein the second set of perception data is indicative of a perceptive parameter of the surrounding environment of the vehicle during the time period;
evaluate the obtained second set of perception data against the formed baseline worldview in order to identify a match between the perceptive parameter of the second set of perception data and a corresponding perceptive parameter in the baseline worldview;
if a match between the perceptive parameter of the second set of perception data and the corresponding perceptive parameter in the baseline worldview is identified, the control circuitry is further configured to an estimation error of the matched perceptive parameter of the second set of perception data in reference to the corresponding perceptive parameter in the baseline worldview;
if no match between the perceptive parameter of the second set of perception data and the corresponding perceptive parameter in the baseline worldview is identified or if the estimation error exceeds a threshold, the control circuitry is further configured to:
update one or more parameters of the perception model of the perception-development module by means of a weakly supervised learning algorithm based on the sensor data used for the second set of perception data and by using the baseline worldview to weakly annotate the second set of perception data; or
transmit the stored sensor data, the stored second set of perception data, and the baseline worldview as weakly annotated data to a remote entity for off-board processing.

11. The system according to claim 10, wherein the baseline worldview constitutes a ground truth for the second set of perception data.

12. The system according to claim 10, wherein the time period ranges from a first time point to a second time point, and wherein the control circuitry is configured to form the baseline worldview by:
determining, based on post processing a portion of the first set of perception data ranging back from the second time point to an intermediate time point between the first and second time points, the baseline worldview indicative of the surrounding environment of the vehicle conditional on the portion of the first set of perception data.

13. The system according to claim 12, wherein the post processing of the portion of the first set of perception data comprises:
running the portion of the first set of perception data through a backwards filter configured to align a set of perceptive parameters of the first set of perception data at the intermediate time point based on a development of the state(s) of the set of perceptive parameters from the intermediate time point to the second time point.

14. A vehicle comprising:
a set of vehicle-mounted sensors configured to monitor a surrounding environment of the vehicle;
an automated driving system, ADS, having a perception module configured to generate a first set of perception data based on sensor data obtained from one or more of the set of vehicle-mounted sensors;
a perception development module configured to generate the second set of perception data based on a perception model and sensor data obtained from one or more of the set of vehicle-mounted sensors;
a system for weakly annotating data for training of a perception-development module of a vehicle, wherein the vehicle is equipped with an Automated Driving System, ADS, the system comprising control circuitry configured to:
store, during a time period, sensor data obtained from a set of vehicle-mounted sensors configured to monitor a surrounding environment of the vehicle;
store, during the time period, a first set of perception data obtained from a perception module of the vehicle, the perception module being configured to generate the first set of perception data based on sensor data obtained from one or more of the set of vehicle-mounted sensors during the time period;
form, by post-processing the first set of perception data, a baseline worldview from the obtained first set of perception data, the baseline world-view being indicative of a scenario development in the surrounding environment of the vehicle during the time period;

store a second set of perception data from the perception-development module, wherein the perception-development module is configured to generate the second set of perception data based on a perception model and sensor data obtained from one or more of the set of vehicle-mounted sensors during the time period;

wherein the second set of perception data is indicative of a perceptive parameter of the surrounding environment of the vehicle during the time period;

evaluate the obtained second set of perception data against the formed baseline worldview in order to identify a match between the perceptive parameter of the second set of perception data and a corresponding perceptive parameter in the baseline worldview;

if a match between the perceptive parameter of the second set of perception data and the corresponding perceptive parameter in the baseline worldview is identified, the control circuitry is further configured to an estimation error of the matched perceptive parameter of the second set of perception data in reference to the corresponding perceptive parameter in the baseline worldview;

if no match between the perceptive parameter of the second set of perception data and the corresponding perceptive parameter in the baseline worldview is identified or if the estimation error exceeds a threshold, the control circuitry is further configured to:

update one or more parameters of the perception model of the perception-development module by means of a weakly supervised learning algorithm based on the sensor data used for the second set of perception data and by using the baseline worldview to weakly annotate the second set of perception data; or transmit the stored sensor data, the stored second set of perception data, and the baseline worldview as weakly annotated data to a remote entity for off-board processing.

* * * * *